(12) United States Patent
Webster et al.

(10) Patent No.: US 11,429,110 B1
(45) Date of Patent: Aug. 30, 2022

(54) SYSTEM FOR OBSTACLE AVOIDANCE BY AUTONOMOUS MOBILE DEVICE

(71) Applicant: AMAZON TECHNOLOGIES, INC., Seattle, WA (US)

(72) Inventors: Roger Robert Webster, Los Altos, CA (US); Rajasimman Madhivanan, San Francisco, CA (US); Madan Jayaprakasam, Fremont, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 592 days.

(21) Appl. No.: 16/422,846

(22) Filed: May 24, 2019

(51) Int. Cl.
| G01C 22/00 | (2006.01) |
| G05D 1/00 | (2006.01) |
| G05D 1/02 | (2020.01) |
| G06T 7/70 | (2017.01) |
| G06T 11/20 | (2006.01) |
| G06T 7/50 | (2017.01) |
| G06V 20/10 | (2022.01) |

(52) U.S. Cl.
CPC ......... *G05D 1/0246* (2013.01); *G05D 1/0088* (2013.01); *G05D 1/0214* (2013.01); *G06T 7/50* (2017.01); *G06T 7/70* (2017.01); *G06T 11/20* (2013.01); *G06V 20/10* (2022.01); *G05D 1/028* (2013.01); *G05D 1/0257* (2013.01)

(58) Field of Classification Search
CPC .. G05D 1/0246; G05D 1/0088; G05D 1/0214; G05D 1/0257; G05D 1/028; G06T 7/50; G06T 7/70; G06T 11/20; G06K 9/00664
See application file for complete search history.

(56) References Cited

U.S. PATENT DOCUMENTS

| 2005/0187678 | A1* | 8/2005 | Myeong | G05D 1/0255 701/27 |
| 2006/0241827 | A1* | 10/2006 | Fukuchi | G05D 1/0251 701/23 |
| 2019/0286145 | A1* | 9/2019 | LaFary | G05D 1/024 |
| 2020/0159227 | A1* | 5/2020 | Cohen | G05D 1/0212 |
| 2020/0340826 | A1* | 10/2020 | Li | G01C 21/206 |
| 2021/0181752 | A1* | 6/2021 | Appelman | G05D 1/024 |

OTHER PUBLICATIONS

Marder-Eppstein, et al., "costmap 2D—ROS Wiki". ROS.org. [last edited Jan. 10, 2018 15:43:59] [retrieved on May 17, 2019]. Retrieved from the Internet: URL: https://wiki.ros.org/costmap_2d. Matlab, "Class: robotics.OccupancyGrid Package: robotics". [retrieved on May 17, 2019], Retrieved from the Internet: URL: https://www.mathworks.com/help/robotics/ref/robotics.occupancygrid.inflate.html.

* cited by examiner

*Primary Examiner* — Harry Y Oh
(74) *Attorney, Agent, or Firm* — Lindauer Law, PLLC

(57) ABSTRACT

An autonomous mobile device (AMD) moves through a physical space without human intervention. Data from sensors on the AMD are used to determine an occupancy map indicative of obstacles and their locations in the physical space. A navigation map is created from the occupancy map by inflating the apparent size of the obstacles indicated by the occupancy map. In one implementation the inflation process dynamically skips some portions of the occupancy map based on the presence of an obstacle and a designated inflation distance. The extent of the inflation is based on a size of the AMD. The navigation map is then used for path planning.

20 Claims, 8 Drawing Sheets

| Index Value 402 | Location (Relative to Origin) 404 | Obstacle Value 406 | Obstacle Type 408 |
|---|---|---|---|
| 1 | 397, 713 | 0 | - |
| 2 | 399, 713 | 0 | - |
| 3 | 401, 713 | 1 | Table |
| 4 | 403, 713 | 1 | Table |
| 5 | 405, 713 | 1 | Table |
| 6 | 407, 713 | 0 | - |
| 7 | 409, 713 | 0 | - |
| 8 | 411, 713 | 0 | - |

500

INFLATION PARAMETER(S) 230

| AMD Configuration 502 | Inflation Distance 504 |
|---|---|
| Compact | 1 |
| Arm at maximum extension | 5 |
| Display at maximum extension | 3 |

⋮

| Obstacle Type 408 | Inflation Adjustment Value 506 |
|---|---|
| User | 3 |
| Hard furniture | 2 |
| Soft furniture | 1 |
| Fragile Object | 4 |

⋮

| Region (of Space) 508 | Inflation Adjustment Value 506 |
|---|---|
| Living Room | 0 |
| Kitchen | 3 |
| Hallway | 1 |
| Dining Room | 2 |

SYSTEM FOR OBSTACLE AVOIDANCE BY AUTONOMOUS MOBILE DEVICE

BACKGROUND

An autonomous mobile device (AMD) moves throughout a physical space. It is advantageous for the AMD to avoid obstacles in the physical space.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 5 illustrates inflation parameters that may be used to generate the navigation map, according to some implementations.

Figure 1:
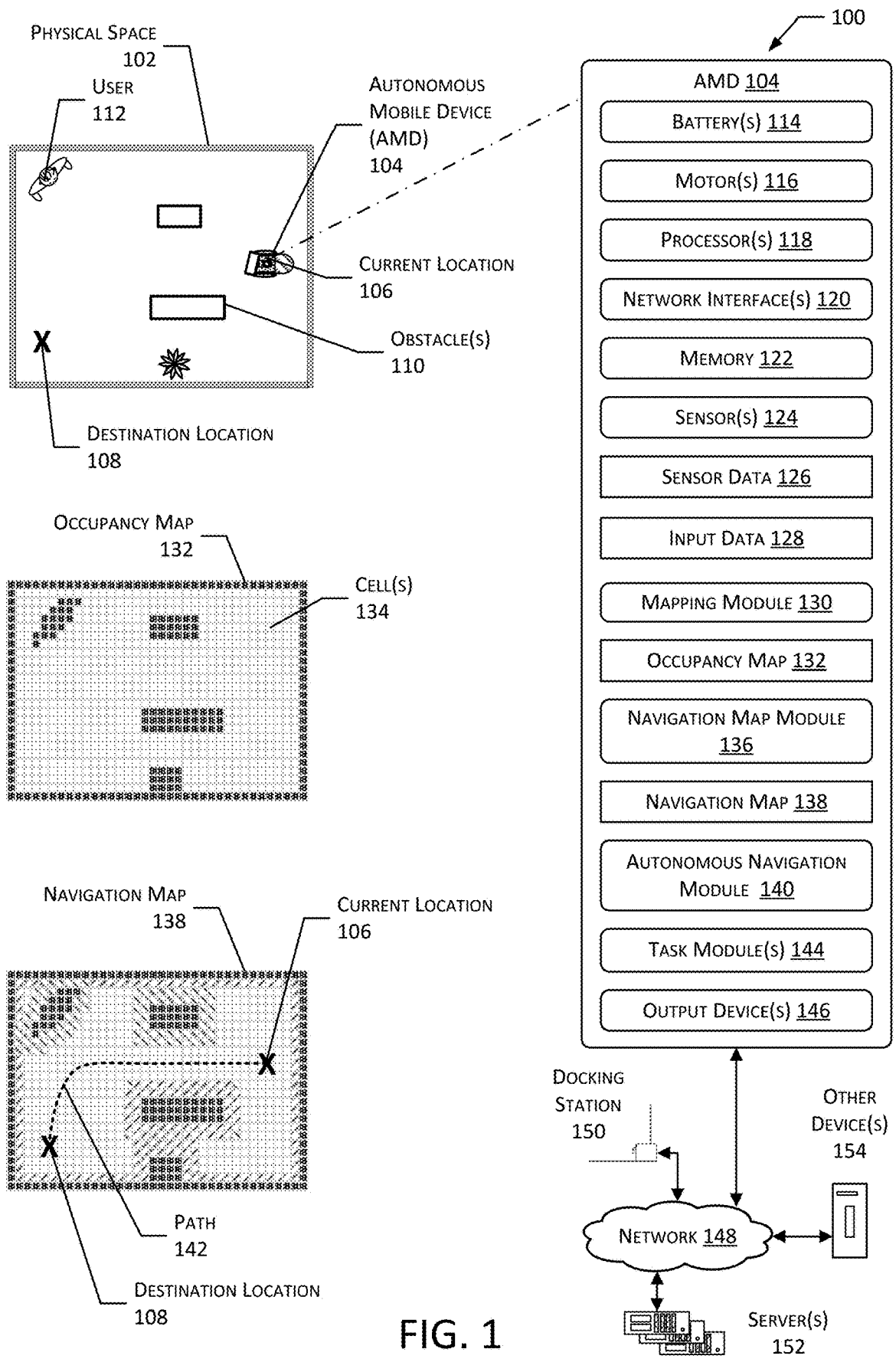
FIG. 1 illustrates a system for obstacle avoidance by an autonomous mobile device (AMD) using a navigation map, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement, allowing it to move from one location in the physical space to another without being "driven" or remotely controlled by a user. The AMD may perform tasks that involve moving within the physical space. These tasks may also include patrolling the physical space, interacting with users, and so forth. For example, the AMD may be commanded to perform sentry tasks involving moving through rooms in the physical space.

Sensors on the AMD or in the physical space acquire sensor data. The sensor data is processed to determine information such as a current location of the AMD in the physical space, an occupancy map indicative of obstacles in the physical space, and so forth. While moving within the physical space the AMD should avoid collisions with obstacles and avoid getting trapped. For example, the AMD should avoid colliding with obstacles such as furnishings, walls, people, falling down stairs, and so forth. In another example the AMD should avoid moving into confined areas where it could become wedged, unable to turn, and so forth.

To move autonomously, a path from a first location to a second location in the physical space is determined. As described above, an occupancy map is determined using sensor data. The occupancy map comprises cells in a specified arrangement, a grid of cells. Each cell may be represented by an index value indicative of that cell within the grid. Each cell is associated with a particular location in the physical space. For example, each cell may represent an area that is 10 centimeters (cm) by 10 cm. Each cell may also be associated with an obstacle value that indicates whether the particular location of that cell contains an obstacle. For example, an obstacle value of 0 may indicate no obstacle, while 1 indicates an obstacle is present.

The AMD has a footprint and volume that it takes up within the physical space. The footprint may be a particular shape, such as a rectangle 45 cm long and 24 cm wide. The footprint may also change based on the configuration of the AMD. For example, the footprint of the AMD may increase if it has an appendage such as a moveable display or manipulator arm extended.

Planning a path through the physical space that avoids collision with obstacles while also taking into consideration the footprint of the AMD is computationally intensive. For example, the edges of the footprint given a particular location and orientation would need to be calculated and compared to the location of obstacles. This significantly increases the amount of memory and processing time needed. More expensive computing resources are needed, power consumption is increased, and latency to plan the path increases.

To reduce the computational complexity for path planning, the AMD may be considered a single point, rather than a polygon. While computationally convenient, use of this simplifying assumption could result in a path being planned in which the actual AMD, which has width and is not simply a point, collides with an obstacle. For example, a path between two objects which are 5 cm apart may be valid for a point with no width, but the AMD with an overall width of 24 cm would collide with the objects.

To mitigate the problems associated with the simplification of the AMD as a single point, for path planning, the apparent size of the obstacles may be increased or "inflated". The occupancy map is used as input and a navigation map is generated. The navigation map depicts the obstacles in the occupancy map, but with an increased size based on an inflation distance. This navigation map is then used to plan the path, using the simplifying assumption of the AMD as a single point.

Size of the AMD is used to determine the inflation distance. For example, if the AMD has an overall width of 24, then a distance from a centerline of the AMD to an edge is 12 cm. The distance from the centerline to the edge of 12 cm plus an additional safety margin of 3 cm results in an inflation distance of 15 cm. Other factors, such as an obstacle type, configuration of the AMD, and so forth may also be used to determine the inflation distance. For example, the apparent size of an obstacle having an obstacle type of "fragile" may be further inflated, resulting in the AMD maintaining a greater distance from that obstacle. In another example, if the AMD is in a compact configuration, such as when all appendages are withdrawn to produce a smallest possible footprint, the inflation distance may be reduced.

Traditional techniques to inflate the obstacles as represented in an occupancy map to generate a navigation map are computationally inefficient and slow. For example, iterating through every single cell in the occupancy map uses a substantial amount of computational resources on the AMD and takes time. The latency of traditional techniques requires the use of expensive computer hardware in a brute force approach to provide the navigation map quickly enough for the AMD to plan the path in an ongoing fashion used for continuous movement.

Described in this disclosure are techniques for obstacle avoidance by an AMD using a navigation map generated with a highly efficient inflation process. In the real world, most obstacles as represented in the occupancy map are relatively large, comprising more than one cell. By taking this into consideration, the process described herein skips past cells that have been previously designated as containing obstacles, reducing the number of times the process iterates. As a result, compared to a traditional system, there is a substantial decrease in the computational resources needed, and a significant reduction in the latency. As a result, the navigation map may be generated more quickly, allowing improved path planning and facilitating the autonomous movement of the AMD.

The process begins by processing through the cells in the occupancy map, determining if the obstacle value for an $i^{th}$ cell is indicative of an obstacle being associated with that $i^{th}$ cell, where i is an index value of a cell within the occupancy map. For example, the index value may be indicative of a column within a row, or a position within a two dimensional grid.

If the $i^{th}$ cell has an obstacle value greater than a threshold value, neighboring cells that are within an inflation distance d1 of the $i^{th}$ cell have their obstacle values set to indicate presence of an obstacle. This produces the inflation effect, increasing the apparent size in the navigation map of the obstacles in the physical space.

An ordered set of candidate cells are determined. This ordered set is made up of those cells with an index value of N, N−1, through N−d1, where N=i+1+(2*d1). Each of the candidate cells in the set are tested in order to determine if that candidate cell has an obstacle value indicative of an obstacle being present. For example, N is tested first, N−1 is tested second, N−2 is tested third, and so on until N−d1. The first occurrence of a cell in the ordered set of candidate cells that contains an obstacle is used. This has the effect of having the process skip ahead beyond the boundary of the current $i^{th}$ cell that is known to contain an obstacle and test for an obstacle. If an obstacle is found at that farthest candidate cell the process continues, marking those neighboring cells as having obstacles, and jumping ahead again. If not, the next candidate cell which is closer to the $i^{th}$ cell is tested for an obstacle, and so on.

Returning to the earlier observation that obstacles in the real world are relatively large, during operation the process is able to very quickly produce a navigation map with inflated obstacles. For example, the larger an object is, the more quickly it will be inflated as the process skips ahead more frequently in this situation.

By using the techniques described, the AMD is able to quickly process an occupancy map and determine a navigation map. The navigation map may then be used for autonomous navigation. The techniques described reduce the computational resources and time needed to determine the navigation map, improving the overall safety and performance of the AMD while navigating autonomously. As a result of these techniques, the operation of the AMD within the physical space is significantly improved.

Illustrative System

FIG. 1 illustrates a system 100 for obstacle avoidance in a physical space 102 by an autonomous mobile device (AMD) 104 using a navigation map, according to some implementations.

The AMD 104 is located at a current location 106 and may move to a destination location 108. One or more obstacles 110 may be present within the physical space 102. For example, obstacles 110 may comprise walls, furnishings, one or more users 112, and so forth. While moving from the current location 106 to the destination location 108, the AMD 104 needs to avoid colliding with any of these obstacles 110. The command to move may be the result of an input from the user 112 or another source.

The physical space 102 may be divided into one or more regions (not shown for clarity). For example, the room depicted here, or a portion thereof, may be designated as a region. A region is a designated area or areas within the physical space 102. The region may comprise a single contiguous area or more than one non-contiguous areas. In some implementations a region may be further subdivided into sub-regions.

The AMD 104 may include a battery(s) 114 to provide electrical power for operation of the AMD 104. The battery 114 may be rechargeable, allowing it to store electrical energy obtained from an external source. In other implementations a wireless power receiver may be used to provide power for operation of the AMD 104, recharge the battery 114, and so forth.

One or more motors 116 or other actuators enable the AMD 104 to move from one location in the physical space 102 to another. For example, a motor 116 may be used to drive a wheel attached to a chassis of the AMD 104, which causes the AMD 104 to move. The AMD 104 may turn, move forward, move backward, and so forth.

During use, the user 112 may issue a command. For example, the user 112 may provide speech input by uttering the command "robot, come here". In another example, the user 112 may indicate the command using a computing device, such as a smartphone or tablet computer. Data indicative of the command may then be provided to the AMD 104.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more network interfaces 120. The network interfaces 120 may include devices to connect to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth.

The AMD 104 includes one or more memories 122. The memory 122 may comprise one or more non-transitory computer-readable storage media (CRSM).

The AMD 104 may include one or more sensors 124. For example, the sensors 124 may include microphones, cameras, LIDAR, and so forth. The sensors 124 may generate sensor data 126. The sensors 124 are discussed in more detail with regard to FIG. 3.

During operation the AMD 104 may determine input data 128. The input data 128 may include or be based at least in part on sensor data 126 from the sensors 124 onboard the AMD 104. In one implementation, a speech processing module may process raw audio data obtained by a microphone on the AMD 104 and produce input data 128. For example, the user 112 may say "robot, come here" which may produce input data 128 "come here".

A mapping module 130 generates an occupancy map 132 that is representative of the physical features in the physical space 102. For example, the sensors 124 may comprise one or more cameras that obtain sensor data 126 comprising image data of the physical space 102. The image data may be processed to determine the presence of obstacles 110. The occupancy map 132 may comprise data that indicates the location of one or more obstacles 110, such as a table, wall, stairwell, and so forth. In some implementations, the occupancy map 132 may comprise a plurality of cells 134 with each cell 134 of the plurality of cells 134 representing a particular area in the physical space 102. Data may be stored that indicates whether a cell 134 contains an obstacle 110. An obstacle 110 may comprise an object or feature that prevents or impairs traversal by the AMD 104. For example, an obstacle 110 may comprise a wall, stairwell, and so forth. With regard to the occupancy map 132, a particular set of cells 134 may be designated as a region.

In this illustration, the occupancy map 132 comprises the plurality of cells 134. Cells 134 that are shaded are those having an obstacle value above a threshold value that is indicative of containing an obstacle 110. Cells 134 that are not shaded are deemed traversable by the AMD 104.

The occupancy map 132 may be manually or automatically determined. For example, during a learning phase the user 112 may take the AMD 104 on a tour of the physical space 102, allowing the AMD 104 to generate the occupancy map 132 and associated data, such as tags designating a particular obstacle type, such as "furniture" or "fragile". In another example, during subsequent operation, the AMD 104 may generate the occupancy map 132 that is indicative of locations and types of obstacles such as chairs, doors, stairwells, and so forth as it moves unattended through the physical space 102.

Modules described herein, such as the mapping module 130, may provide various processing functions such as de-noising, filtering, and so forth. Processing of sensor data 126, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 126. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 126 or other data. For example, the ANN may be trained using a supervised learning algorithm such that object identifiers are associated with images of particular objects within training images provided to the ANN. Once trained, the ANN may be provided with the sensor data 126 and produce output indicative of the object identifier.

A navigation map module 136 uses the occupancy map 132 as input to generate a navigation map 138. For example, the navigation map module 136 produces the navigation map 138 using the process described herein to inflate or enlarge the obstacles 110 indicated by the occupancy map 132. In this illustration, the navigation map 138 depicts the various obstacles 110 in the physical space 102 as indicated by the occupancy map 132, but now enlarged.

An autonomous navigation module 140 provides the AMD 104 with the ability to navigate within the physical space 102 without real-time human interaction. The autonomous navigation module 140 may implement, or operate in conjunction with, the mapping module 130 to determine one or more of the occupancy map 132, the navigation map 138, or other representations of the physical space 102. The autonomous navigation module 140 is discussed in more detail with regard to FIG. 2.

The AMD 104 autonomous navigation module 140 may generate path plan data that is indicative of a path 142 through the physical space 102 from the current location 106 to the destination location 108. The AMD 104 may then begin moving along the path 142.

While moving along the path 142, the AMD 104 may assess the physical space 102 and update or change the path 142 as appropriate. For example, if an obstacle 110 appears in the path 142, the mapping module 130 may determine the presence of the obstacle 110 as represented in the occupancy map 132 and navigation map 138. The now updated navigation map 138 may then be used to plan an alternative path 142 to the destination location 108.

The AMD 104 may utilize one or more task modules 144. The task module 144 comprises instructions that, when executed, provide one or more functions. The task modules 144 may perform functions such as finding a user 112, following a user 112, present output on output devices 146 of the AMD 104, perform sentry tasks by moving the AMD 104 through the physical space 102 to determine the presence of unauthorized people, and so forth.

The AMD 104 includes one or more output devices 146, such as one or more of a motor 116, light, speaker, display, projector, printer, and so forth. One or more output devices 146 may be used to provide output during operation of the AMD 104. The output devices 146 are discussed in more detail with regard to FIG. 3.

The AMD 104 may use the network interfaces 120 to connect to a network 148. For example, the network 148 may comprise a wireless local area network, that in turn is connected to a wide area network such as the Internet.

The AMD 104 may be configured to dock or connect to a docking station 150. The docking station 150 may also be connected to the network 148. For example, the docking station 150 may be configured to connect to the wireless local area network 148 such that the docking station 150 and the AMD 104 may communicate. The docking station 150 may provide external power which the AMD 104 may use to charge the battery 114.

The AMD 104 may access one or more servers 152 via the network 148. For example, the AMD 104 may utilize a wakeword detection module to determine if the user 112 is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user 112 to one or more servers 152 for further processing. The servers 152 may process the spoken audio and return to the AMD 104 data that may be subsequently used to operate the AMD 104.

The AMD 104 may also communicate with other devices 154. The other devices 154 may include one or more devices that are within the home or associated with operation of one or more devices in the home. For example, the other devices 154 may include a doorbell camera, a garage door opener, a refrigerator, washing machine, and so forth. In some implementations the other devices 154 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

Figure 2:
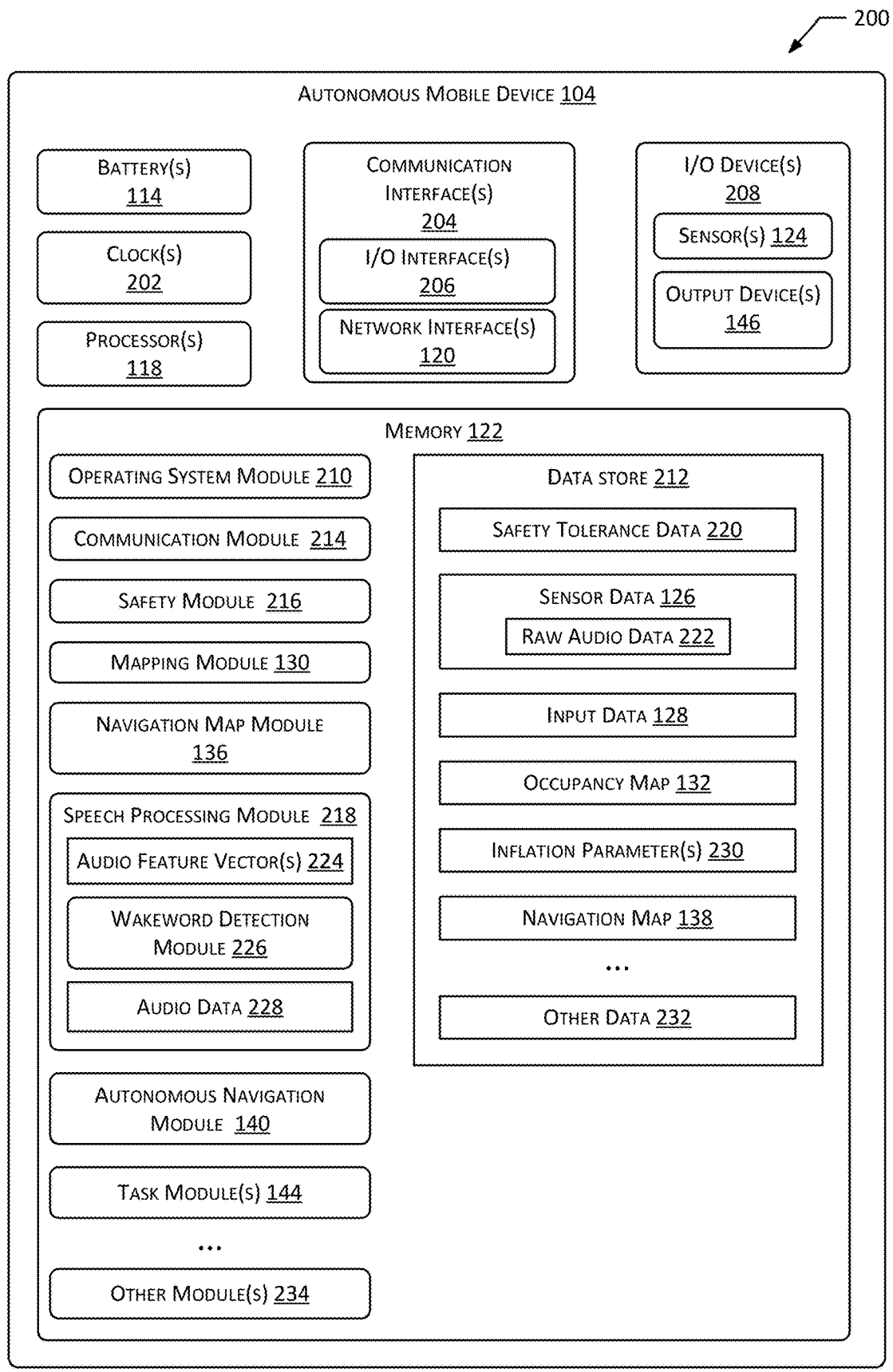
FIG. 2 is a block diagram of the components of the AMD, according to some implementations.

FIG. 2 is a block diagram 200 of the AMD 104, according to some implementations. The AMD 104 may include one or more batteries 114 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

One or more clocks 202 may provide information indicative of date, time, ticks, and so forth. For example, the processor 118 may use data from the clock 202 to associate a particular time with an action, sensor data 126, and so forth.

The AMD 104 may include one or more hardware processors 118 (processors) configured to execute one or more stored instructions. The processors 118 may comprise one or more cores. The processors 118 may include microcontrollers, systems on a chip, field programmable gate arrays, digital signal processors, graphic processing units, general processing units, and so forth.

The AMD 104 may include one or more communication interfaces 204 such as input/output (I/O) interfaces 206, network interfaces 120, and so forth. The communication interfaces 204 enable the AMD 104, or components thereof, to communicate with other devices 154 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 124, keyboard, mouse, scanner, and so forth. The I/O devices 208 may also include output devices 146 such as one or more of a motor 116, light, speaker, display, projector, printer, and so forth. In some embodiments, the I/O devices 208 may be physically incorporated with the AMD 104 or may be externally placed.

The network interfaces 120 may be configured to provide communications between the AMD 104 and other devices 154 such as other AMDs 104, docking stations 150, routers, access points, and so forth. The network interfaces 120 may include devices configured to couple to personal area networks (PANs), local area networks (LANs), wireless local area networks (WLANS), wide area networks (WANs), and so forth. For example, the network interfaces 120 may include devices compatible with Ethernet, Wi-Fi, Bluetooth, Bluetooth Low Energy, ZigBee, and so forth.

The AMD 104 may also include one or more busses or other internal communications hardware or software that allow for the transfer of data between the various modules and components of the AMD 104.

As shown in FIG. 2, the AMD 104 includes one or more memories 122. The memory 122 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 122 provides storage of computer-readable instructions, data structures, program modules, and other data for the operation of the AMD 104. A few example functional modules are shown stored in the memory 122, although the same functionality may alternatively be implemented in hardware, firmware, or as a system on a chip (SoC).

The memory 122 may include at least one operating system (OS) module 210. The OS module 210 is configured to manage hardware resource devices such as the I/O interfaces 206, the I/O devices 208, the communication interfaces 204, and provide various services to applications or modules executing on the processors 118. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS) as promulgated at www.ros.org, and so forth.

Also stored in the memory 122 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 154 including other AMDs 104, servers 152, network attached storage devices, and so forth.

A communication module 214 may be configured to establish communication with other devices 154, such as other AMDs 104, an external server 152, a docking station 150, and so forth. The communications may be authenticated, encrypted, and so forth.

Other modules within the memory 122 may include a safety module 216, the mapping module 130, the navigation map module 136, the autonomous navigation module 140, the one or more task modules 144, a speech processing module 218, or other modules 234. The modules may access data stored within the data store 212, including safety tolerance data 220, sensor data 126, inflation parameters 230, other data 232, and so forth.

The safety module 216 may access the safety tolerance data 220 to determine within what tolerances the AMD 104 may operate safely within the physical space 102. For example, the safety module 216 may be configured to stop the AMD 104 from moving when an extensible mast of the AMD 104 is extended. In another example, the safety tolerance data 220 may specify a minimum sound threshold which, when exceeded, stops all movement of the AMD 104. Continuing this example, detection of sound such as a human yell would stop the AMD 104. In another example, the safety module 216 may access safety tolerance data 220 that specifies a minimum distance from an object that the AMD 104 is to maintain. Continuing this example, when a sensor 124 detects an object has approached to less than the minimum distance, all movement of the AMD 104 may be stopped. Movement of the AMD 104 may be stopped by one or more of inhibiting operations of one or more of the motors 116, issuing a command to stop motor operation, disconnecting power from one or more the motors 116, and so forth. The safety module 216 may be implemented as hardware, software, or a combination thereof.

The safety module 216 may control other factors, such as a maximum speed of the AMD 104 based on information obtained by the sensors 124, precision and accuracy of the sensor data 126, and so forth. For example, detection of an object by an optical sensor may include some error, such as when the distance to an object comprises a weighted average between an object and a background. As a result, the maximum speed permitted by the safety module 216 may be based on one or more factors such as the weight of the AMD 104, nature of the floor, distance to the object, and so forth. In the event that the maximum permissible speed differs from the maximum speed permitted by the safety module 216, the lesser speed may be utilized.

The navigation map module 136 uses the occupancy map 132 as input to generate the navigation map 138. One or more inflation parameters 230 may be used during operation. The inflation parameters 230 provide information such as inflation distance, inflation adjustment values, and so forth. Inflation parameters 230 are discussed in more detail with regard to FIG. 5.

For example, the navigation map module 136 produces the navigation map 138 using the process described herein to inflate or enlarge the obstacles 110 indicated by the occupancy map 132. In this illustration, the navigation map 138 depicts the various obstacles 110 in the physical space 102 as indicated by the occupancy map 132, now enlarged.

The speech processing module 218 may be used to process utterances of the user 112. Microphones may acquire audio in the presence of the AMD 104 and may send raw audio data 222 to an acoustic front end (AFE). The AFE may transform the raw audio data 222 (for example, a single-channel, 16-bit audio stream sampled at 16 kHz), captured by the microphone, into audio feature vectors 224 that may ultimately be used for processing by various components, such as a wakeword detection module 226, speech recognition engine, or other components. The AFE may reduce noise in the raw audio data 222. The AFE may also perform acoustic echo cancellation (AEC) or other operations to account for output audio data that may be sent to a speaker of the AMD 104 for output. For example, the AMD 104 may be playing music or other audio that is being received from a network 148 in the form of output audio data. To avoid the output audio interfering with the device's ability to detect and process input audio, the AFE or other component may perform echo cancellation to remove the output audio data from the input raw audio data 222, or other operations.

The AFE may divide the raw audio data 222 into frames representing time intervals for which the AFE determines a number of values (i.e., features) representing qualities of the raw audio data 222, along with a set of those values (i.e., a feature vector or audio feature vector 224) representing features/qualities of the raw audio data 222 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 222, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 222) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user 112 intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 222 or the audio feature vectors 224) to one or more server(s) 152 for speech processing. The audio data 228 corresponding to audio obtained by the microphone may be processed locally on one or more of the processors 118, sent to a server 152 for routing to a recipient device or may be sent to the server 152 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by the navigation map module 136, prior to sending to the server 152, and so forth.

The speech processing module 218 may include or access an automated speech recognition (ASR) module. The ASR module may accept as input raw audio data 222, audio feature vectors 224, or other sensor data 126 and so forth and may produce as output the input data 128 comprising a text string or other data representation. The input data 128 comprising the text string or other data representation may be processed by the navigation map module 136 to determine the command to be executed. For example, the utterance of the command "robot, come here" may result in input data 128 comprising the text string "come here". The wakeword "robot" may be omitted from the input data 128.

The autonomous navigation module 140 provides the AMD 104 with the ability to navigate within the physical space 102 without real-time human interaction. The autonomous navigation module 140 may implement, or operate in conjunction with, the mapping module 130 to determine the occupancy map 132, the navigation map 138, or other representation of the physical space 102. In one implementation, the mapping module 130 may use one or more simultaneous localization and mapping ("SLAM") techniques. The SLAM algorithms may utilize one or more of maps, algorithms, beacons, or other techniques to navigate. The autonomous navigation module 140 may use the navigation map 138 to determine a set of possible paths along which the AMD 104 may move. One of these may be selected and used to determine a path 142. For example, a possible path that is the shortest or has the fewest turns may be selected and used to determine the path 142. The path 142 is then subsequently used to determine a set of commands that drive the motors 116 connected to the wheels. For example, the autonomous navigation module 140 may determine the current location 106 within the physical space 102 and determine a path 142 to the destination location 108.

The autonomous navigation module 140 may utilize various techniques during processing of sensor data 126. For example, image data obtained from cameras on the AMD 104 may be processed to determine one or more of corners, edges, planes, and so forth. In some implementations corners may be detected and the coordinates of those corners may be used to produce point cloud data. This point cloud data may then be used for SLAM or other purposes associated with mapping, navigation, and so forth.

The AMD 104 may move responsive to a determination made by an onboard processor 118, in response to a command received from one or more communication interfaces 204, as determined from the sensor data 126, and so forth. For example, an external server 152 may send a command that is received using the network interface 120. This command may direct the AMD 104 to proceed to find a particular user 112, follow a particular user 112, and so forth. The AMD 104 may then process this command and use the autonomous navigation module 140 to determine the directions and distances associated with carrying out the command. For example, the command to "come here" may result in a task module 144 sending a command to the autonomous navigation module 140 to move the AMD 104 to a particular location near the user 112 and orient the AMD 104 in a particular direction.

The AMD 104 may connect to the network 148 using one or more of the network interfaces 120. In some implementations, one or more of the modules or other functions described here may execute on the processors 118 of the AMD 104, on the server 152, or a combination thereof. For example, one or more servers 152 may provide various functions, such as ASR, natural language understanding (NLU), providing content such as audio or video to the AMD 104, and so forth.

The other modules 234 may provide other functionality, such as object recognition, speech synthesis, user identification, and so forth. The other modules 234 may comprise a speech synthesis module that is able to convert text data to human speech. For example, the speech synthesis module may be used by the AMD 104 to provide speech that a user 112 is able to understand.

The data store 212 may store the other data 232 as well. For example, localization settings may indicate local preferences such as language, user identifier data may be stored that allows for identification of a particular user 112, and so forth.

Figure 3:
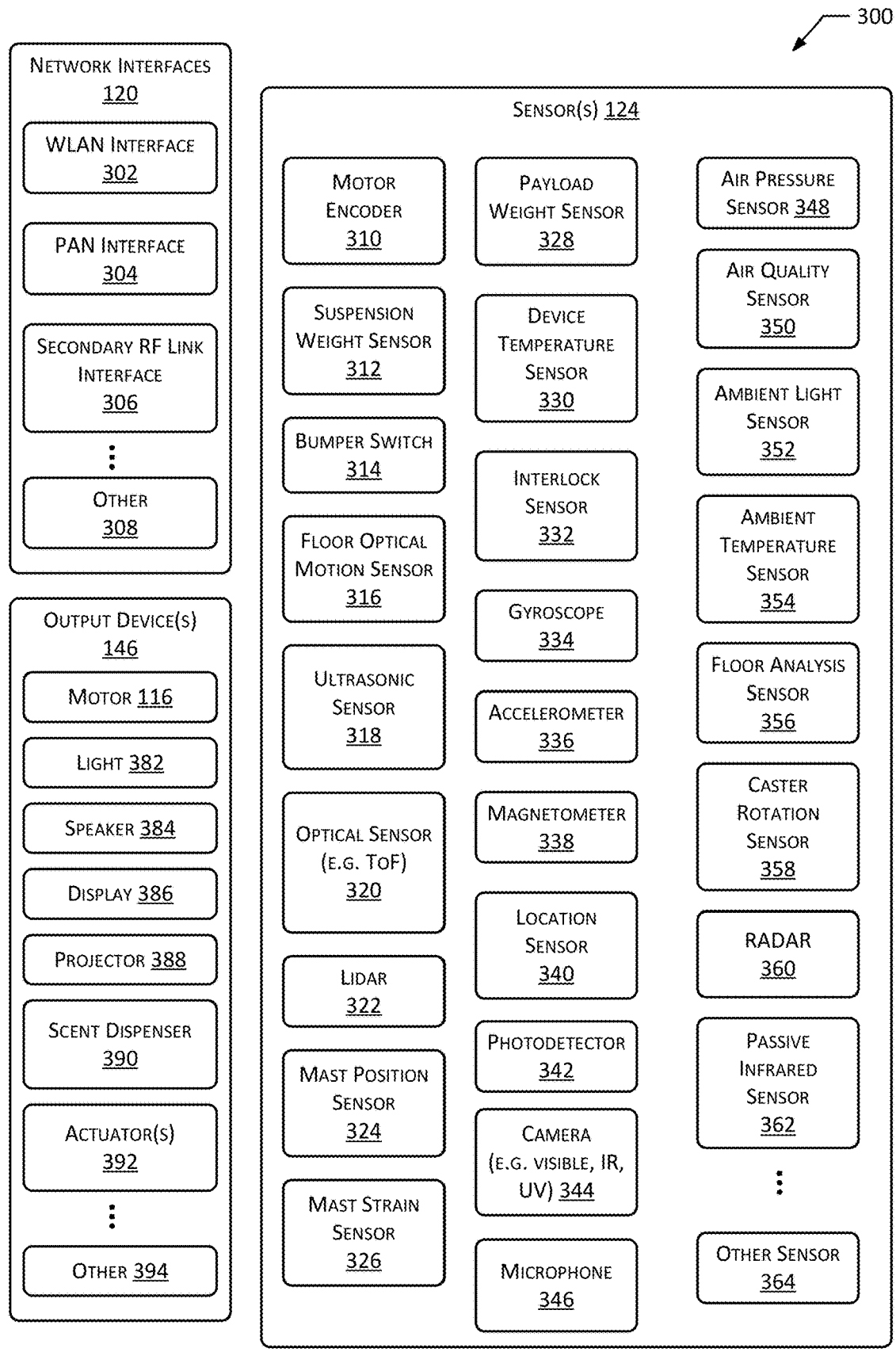
FIG. 3 is a block diagram of some components of the AMD, such as network interfaces, sensors, and output devices, according to some implementations.

FIG. 3 is a block diagram 300 of some components of the AMD 104 such as network interfaces 120, sensors 124, and output devices 146, according to some implementations. The components illustrated here are provided by way of illustration and not necessarily as a limitation. For example, the AMD 104 may utilize a subset of the particular network interfaces 120, output devices 146, or sensors 124 depicted here, or may utilize components not pictured. One or more of the sensors 124, output devices 146, or a combination thereof may be included on a moveable component that may be panned, tilted, rotated, or any combination thereof with respect to a chassis of the AMD 104.

The network interfaces 120 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 154 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 150, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The AMD 104 may include one or more of the following sensors 124. The sensors 124 depicted here are provided by way of illustration and not necessarily as a limitation. It is understood that other sensors 124 may be included or utilized by the AMD 104, while some sensors 124 may be omitted in some configurations.

A motor encoder 310 provides information indicative of the rotation or linear extension of a motor 116. The motor 116 may comprise a rotary motor, or a linear actuator. In some implementations, the motor encoder 310 may comprise a separate assembly such as a photodiode and encoder wheel that is affixed to the motor 116. In other implementations, the motor encoder 310 may comprise circuitry configured to drive the motor 116. For example, the autonomous navigation module 140 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 216 may use data from the suspension weight sensor 312 to determine whether or not to inhibit operation of one or more of the motors 116. For example, if the suspension weight sensor 312 indicates no weight on the suspension, the implication is that the AMD 104 is no longer resting on its wheels, and thus operation of the motors 116 may be inhibited. In another example, if the suspension weight sensor 312 indicates weight that exceeds a threshold value, the implication is that something heavy is resting on the AMD 104 and thus operation of the motors 116 may be inhibited.

One or more bumper switches 314 provide an indication of physical contact between a bumper or other member that is in mechanical contact with the bumper switch 314. The safety module 216 utilizes sensor data 126 obtained by the bumper switches 314 to modify the operation of the AMD 104. For example, if the bumper switch 314 associated with a front of the AMD 104 is triggered, the safety module 216 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 124 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 126 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10' FOV, allowing the sensor to have an overall FOV of 40'.

In another implementation, a structured light pattern may be provided by the optical emitter. A portion of the structured light pattern may then be detected on the object using a sensor 124 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 216 and the autonomous navigation module 140 may utilize the sensor data 126 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 126 may be generated that is indicative of the presence of objects and the relative positions, shapes, and so forth that are visible to the lidar 322. Data from the lidar 322 may be used by various modules. For example, the autonomous navigation module 140 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 216. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a sideload applied to the mast or a weight on the mast or downward pressure on the mast. The safety module 216 may utilize sensor data 126 obtained by the mast strain sensor 326. For example, if the strain applied to the mast exceeds a threshold amount, the safety module 216 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 216 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more of the batteries 114, one or more motors 116, and so forth. In the event the temperature exceeds a threshold value, the component associated with that device temperature sensor 330 may be shut down.

One or more interlock sensors 332 may provide data to the safety module 216 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 126 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 126 indicative of impinging light. For example, the photodetector 342 may provide data indicative of a color, intensity, duration, and so forth.

A camera 344 generates sensor data 126 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user 112 communication, and so forth. For example, a pair of cameras 344 sensitive to infrared light may be mounted on the front of the AMD 104 to provide binocular stereo vision, with the sensor data 126 comprising images being sent to the autonomous navigation module 140. In another example, the camera 344 may comprise a 10 megapixel or greater camera that is used for videoconferencing or for acquiring pictures for the user 112.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 140 may be acquired using a rolling shutter and subsequently may be processed to mitigate image artifacts.

One or more microphones 346 may be configured to acquire information indicative of sound present in the physical space 102. In some implementations, arrays of microphones 346 may be used. These arrays may implement beamforming techniques to provide for directionality of gain. The AMD 104 may use the one or more microphones 346 to acquire information from acoustic tags, accept voice input from users 112, determine a direction of an utterance, determine ambient noise levels, for voice communication with another user 112 or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of the floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 216, the autonomous navigation module 140, the task module 144, and so forth. For example, if the floor analysis sensor 356 determines that the floor is wet, the safety module 216 may decrease the speed of the AMD 104 and generate a notification alerting the user 112.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 124 may include a radar 360. The radar 360 may be used to provide information as to a distance, lateral position, and so forth, to an object.

The sensors 124 may include a passive infrared (PIR) sensor 362. The PIR 362 sensor may be used to detect the presence of users 112, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 140. One or more touch sensors may be utilized to determine contact with a user 112 or other objects.

The AMD 104 may include one or more output devices 146. A motor 116 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user 112. Continuing the example, a motor 116 with an eccentric weight may be used to create a buzz or vibration to allow the AMD 104 to simulate the purr of a cat.

Figure 4:
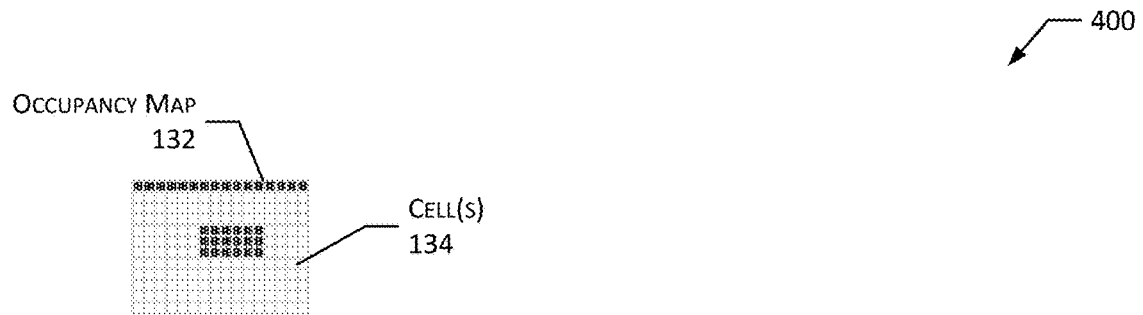
FIG. 4 illustrates data associated with cells in the occupancy map, according to some implementations.

FIG. 4 illustrates data 400 associated with cells in the occupancy map 132, according to some implementations. The occupancy map 132 comprises cells 134 in a specified arrangement. For example, the specified arrangement may comprise a grid or two-dimensional array of cells arranged in rows and columns. Each cell 134 may be represented by an index value 402 indicative of that cell within the grid or within a specific row or column. Each cell 134 is associated with a particular location 404 in physical space within the physical space 102. For example, each cell 134 may represent an area that is 3 cm by 3 cm. Each cell may also be associated with an obstacle value 406 that indicates whether the particular location 404 of that cell 134 contains an obstacle 110. For example, an obstacle value 406 of 0 may indicate no obstacle, while 1 indicates an obstacle is present. In some implementations, a cell 134 or group of cells 134 may be associated with data indicative of an obstacle type 408. For example, the obstacle type 408 may provide information about the nature of the obstacle, such as stairwell, furniture, art, window, door, and so forth.

The navigation map 138 may comprise a similar structure as the occupancy map 132.

FIG. 5 illustrates inflation parameters 230 that may be used by the navigation map module 136 to generate the navigation map 138, according to some implementations.

The navigation map module 136 may use as an input an inflation distance that is based on one or more dimensions of the AMD 104. In one implementation, an overall width of the AMD 104 may be determined that is indicative of a maximum width from edge to edge of the AMD 104 along a line that is perpendicular to a direction of travel or centerline. For example, the maximum width may comprise a width of the AMD 104 at a widest point. The inflation distance may then be greater than or equal to one half of the overall width. For example, if the overall width is 24 cm, the inflation distance would be at least 12 cm.

In another implementation, a maximum distance from a center of rotation of the AMD 104 while turning to an edge of the AMD 104 may be determined. For example, the distance from a center of rotation to the forwardmost left corner of a display that projects from a front of the AMD 104 may be the maximum distance. This maximum distance may then be used as the inflation distance.

The navigation map module 136 may use information about AMD configuration 502 to determine an inflation distance 504. For example, the AMD configuration 502 may provide information about the footprint or physical shape of the AMD 104. In this illustration three AMD configurations 502 are shown with corresponding inflation distances 504. For example, a "compact" configuration has an inflation distance 504 of "1" while a configuration with "arm at maximum extension" has an inflation distance 504 of "5".

As the physical configuration of the AMD 104 changes, the navigation map module 136 may use the AMD configuration 502 to determine the inflation distance 504 to be used.

In some implementations the navigation map module 136 may use an inflation adjustment value 506.

Obstacle types 408 may be associated with inflation adjustment values 506 that may then be used to selectively adjust inflation of those types of obstacles 110. For example, an obstacle type 408 of "soft furniture" has an inflation adjustment value 506 of "1" while an obstacle type 408 of "fragile object" has an inflation adjustment value 506 of "4. During operation, the navigation map module 136 would generate a navigation map 138 using the inflation adjustment values 506 in which the size of the obstacles 110 with an obstacle type 408 of "fragile object" are inflated to a greater degree than those obstacles 110 with an obstacle type 408 of "soft furniture". As a result, the AMD 104 during movement would place greater distance between itself and the "fragile object" than the "soft furniture".

Regions 508 within the physical space 102 may be associated with inflation adjustment values 506. For example, the region 508 designated "living room" may have an inflation adjustment value 506 of "0" while the region 508 designated as "kitchen" may have an inflation adjustment value 506 of "3". As a result, movement of the AMD 104 in the living room may be closer to obstacles 110 than in the kitchen.

One or more inflation parameters 230 may be used in conjunction with one another. For example, the inflation distance may be based on one or more of the AMD configuration 502, obstacle type 408, and region 508.

Figure 6:
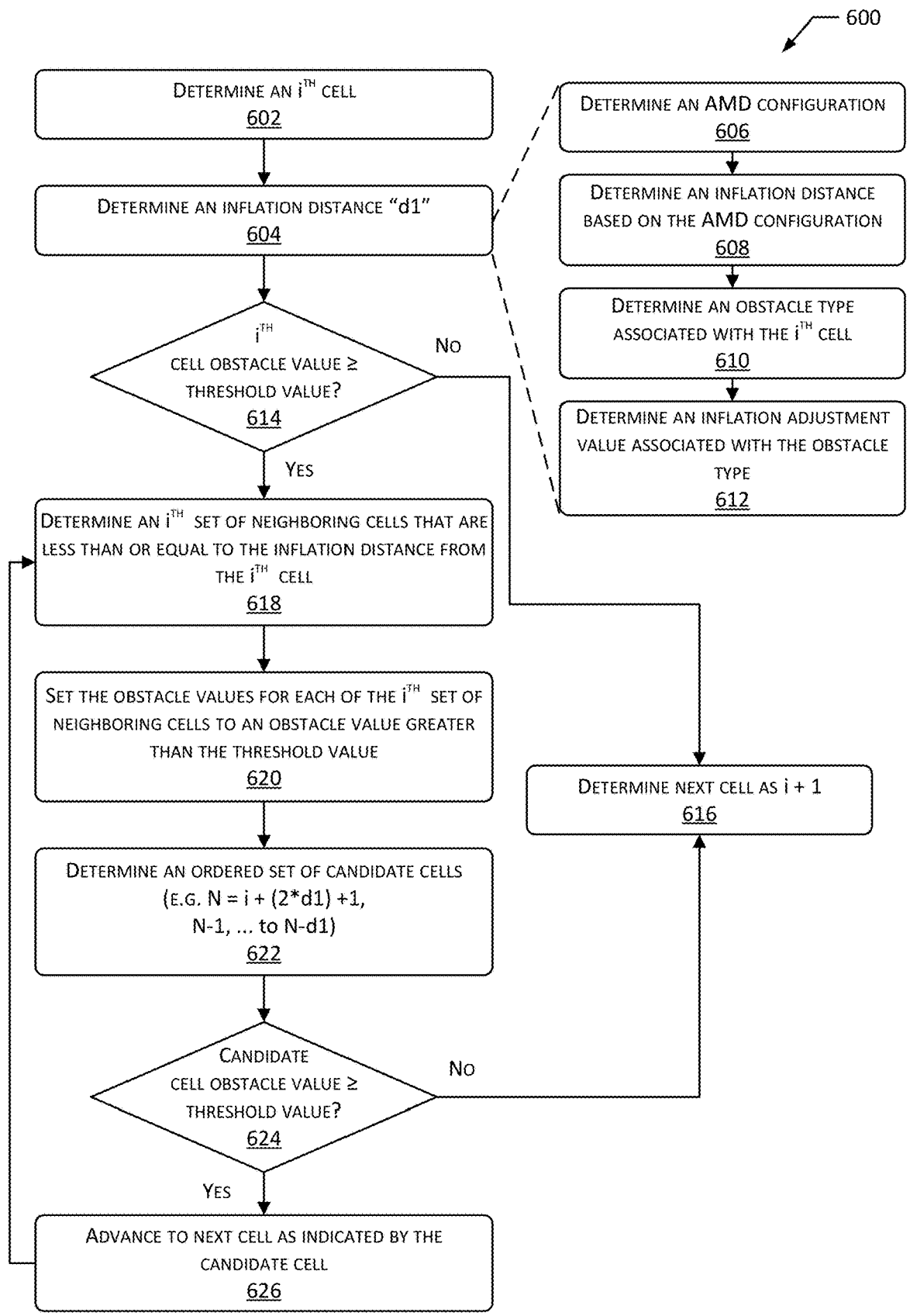
FIG. 6 is a flow diagram of a process for determining a navigation map, according to some implementations.

FIG. 6 is a flow diagram 600 of a process for determining a navigation map 138, according to some implementations.

The process may be implemented at least in part by one or more of the processors 118 on the AMD 104, the docking station 150, the servers 152, or other devices 154.

At 602 an $i^{th}$ cell is determined, where i is an index value 402 of a particular cell 134. In one implementation, the process may begin at a first row and first column of the occupancy map 132, and progress sequentially row by row, column by column, except as otherwise directed in the following steps where cells 134 may be skipped. In other implementations other iterative patterns may be used. For example, the process may iterate through every cell 134 in a row, except as skipped, while skipping every $m^{th}$ row.

At 604 an inflation distance d1 is determined. In one implementation the process of 606 to 612 may be used to determine the inflation distance d1. At 606 the AMD configuration 502 is determined. For example, the AMD 104 may be determined to be in the "compact" configuration based on information obtained from sensors 124 on the AMD 104, data stored during operation of the AMD 104, and so forth.

At 608 the inflation distance 504 associated with the AMD configuration 502 is determined. For example, the inflation distance 504 may be retrieved from a lookup table in response to the AMD configuration 502.

At 610 an obstacle type 408 associated with the $i^{th}$ cell may be determined. For example, the obstacle type 408 may comprise data associated with the $i^{th}$ cell in the occupancy map 132.

At 612 an inflation adjustment value 506 associated with the obstacle type 408 may be determined. For example, the inflation adjustment value 506 may be retrieved from a lookup table in response to the obstacle type 408.

In some implementations other factors, such as region, planned speed, and so forth may be used to determine other inflation adjustment values 506.

Returning to 604, the inflation distance d1 may be based on the inflation distance 504 which may be modified using the inflation adjustment value(s) 506. For example, the inflation distance d1 may comprise a sum of the inflation distance 504 and any applicable inflation adjustment values 506. In another example, the inflation distance d1 may comprise the inflation distance 504 added to a product of a constant and the inflation adjustment value 506.

At 614 a determination is made as to whether the $i^{th}$ cell has an obstacle value 406 greater than or equal to a threshold value. The threshold value to determine those cells 134 that are associated with an obstacle 110. For example, if an obstacle value of "0" indicates a cell 134 contains no obstacle 110 and an obstacle value of "1" indicates the cell 134 contains an obstacle 110, then the threshold value may be "1".

If the determination at 614 is that the $i^{th}$ cell has an obstacle value 406 that is less than the threshold value (indicating no obstacle present in that cell 134), the process may proceed to 616. At 616 the next cell 134 is determined. For example, the next cell 134 may comprise the cell with the index value 402 of i+1.

If the determination at 614 is that the $i^{th}$ cell has an obstacle value 406 that is greater than or equal to the threshold value (indicating an obstacle is present in that cell 134), the process may proceed to 618.

At 618 an $i^{th}$ set of neighboring cells that are less than or equal to the first inflation distance d1 from the $i^{th}$ cell are determined. The distance may comprise a Euclidean distance, rectilinear or "taxicab" distance, and so forth.

At 620 the obstacle values 406 for each of the $i^{th}$ set of neighboring cells in the navigation map 138 are set to an obstacle value 406 greater than the threshold value. For example, the obstacle values 406 for each of the cells in the $i^{th}$ set of neighboring cells may be set to "1".

At 622 an ordered set of candidate cells is determined. The ordered set of candidate cells comprises cells with an index value of N, N−1, through N−d1, wherein N=i+1+(2*d1). In other implementations other techniques may be used to determine the ordered set. For example, the ordered set may comprise N, N−V, through N−d1, where V is a nonzero integer value.

At 624 a determination is made as to whether a candidate cell in the ordered set of candidate cells has an obstacle value 406 greater than or equal to the threshold value. If the determination is no, the process proceeds to 616. If the determination is yes, the process proceeds to 626.

At 626 the next cell is determined as being the first occurrence of a candidate cell having an obstacle value 406 greater than or equal to the threshold value and the process advances to 618 using the next cell as the $i^{th}$ cell.

The determination of the next cell from the ordered set is illustrated using TABLE 1. Assume that the i=5 and d1=3.

TABLE 1

| Order | Index Value of Candidate Cell | Obstacle Value of the Candidate Cell |
|---|---|---|
| First | 12 | 1 |
| Second | 11 | 1 |
| Third | 10 | 1 |

The first candidate cell has an index value of "12" and an obstacle value of "1" which is greater than or equal to the threshold value. As a result, the first candidate cell is selected and the next cell is the cell with the index value 402 of "12". The process has now "skipped" cells i=5 through 11, avoiding the processing for each of those iterations.

This is illustrated next with regard to FIG. 7.

In other implementations other techniques may be used to determine the next cell. For example, a binary search may be used to determine the next cell by determining the cell farthest from the $i^{th}$ cell that is within two times the inflation distance d1 and has an obstacle value greater than the threshold value.

Figure 7:
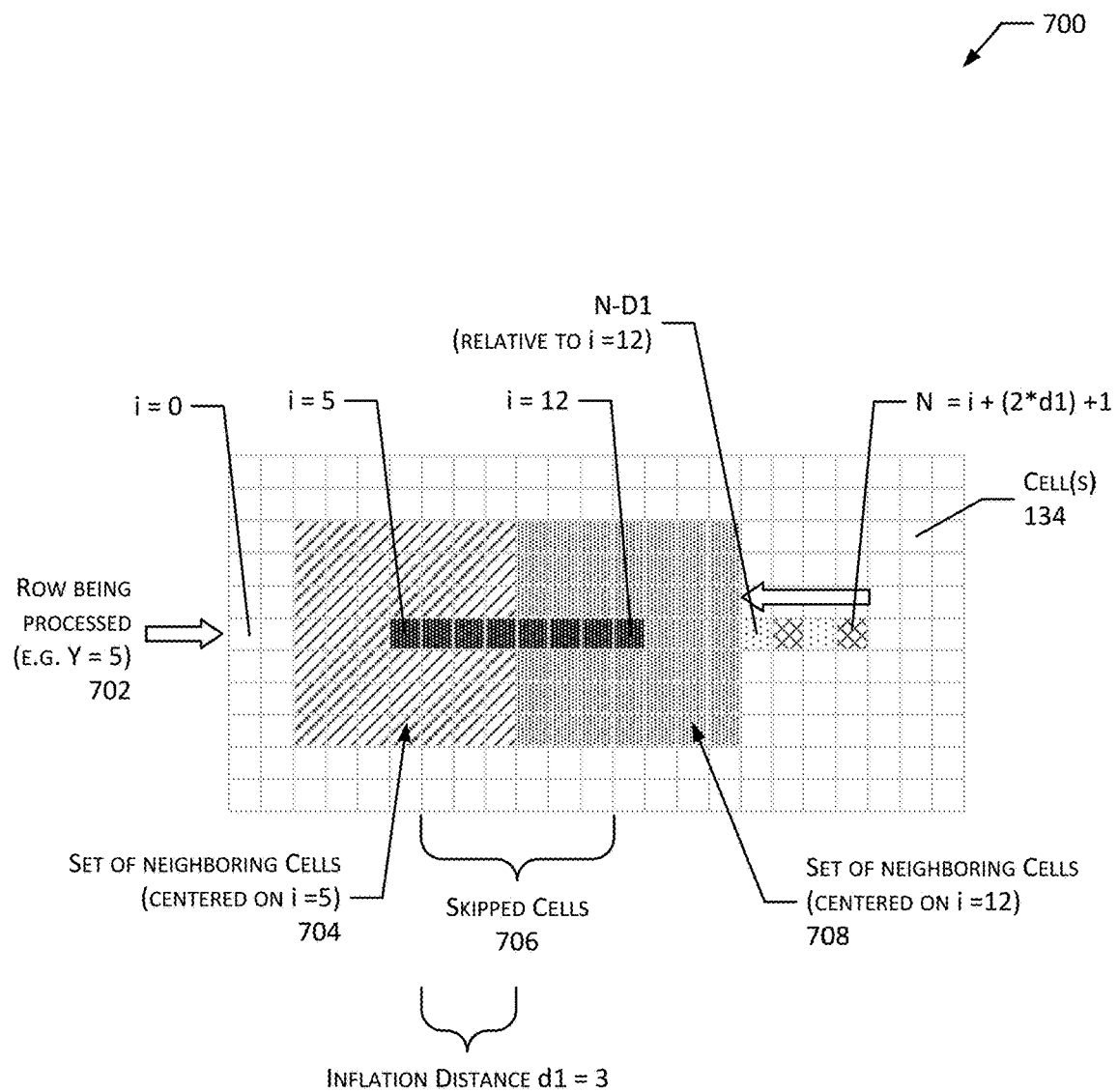
FIG. 7 illustrates neighboring cells and skipping cells as part of the process for determining a navigation map, according to some implementations.

FIG. 7 illustrates at 700 neighboring cells and skipping cells as part of the process for determining a navigation map 138, according to some implementations. For the purposes of this illustration assume the threshold value of "1" and d1="3".

In this illustration, the cells 134 of a portion of the navigation map 138 are depicted. The process as described with regard to FIG. 7 may be currently processing row Y=5 as indicated by arrow 702. For ease of illustration, the row Y=5 begins with an index value 402 of i=0. The obstacle 110 shown exists as a line from cell i=5 to i=12, inclusive.

As the process reaches cell i=5, the obstacle value 406 is "1", greater than or equal to the threshold value of "1". As a result, the first set of neighboring cells 704 are determined centered on cell i=5 extending out a distance of d1 and their obstacle values 406 are set to "1".

The process continues, determining the ordered set of candidate cells. In the first position of that ordered set is N=i+1+(2*d1)=5+1+(2*3)=12. The cell i=12 is tested and the obstacle value 406 is greater than or equal to the threshold value of "1". The process moves past the skipped cells 706 to the cell i=12. A second set of neighboring cells 708 centered on cell i=12 are determined out to the inflation distance d1.

The process continues. In this example, for the next iteration where i=12, N=19, N−1=18, N−2=17, and N−3=16. This ordered set of candidate cells is tested, but the obstacle values 406 are less than the threshold value. In one implementation, the process may then proceed on to 616. In another implementation the process may proceed to i=N+1.

Figure 8:
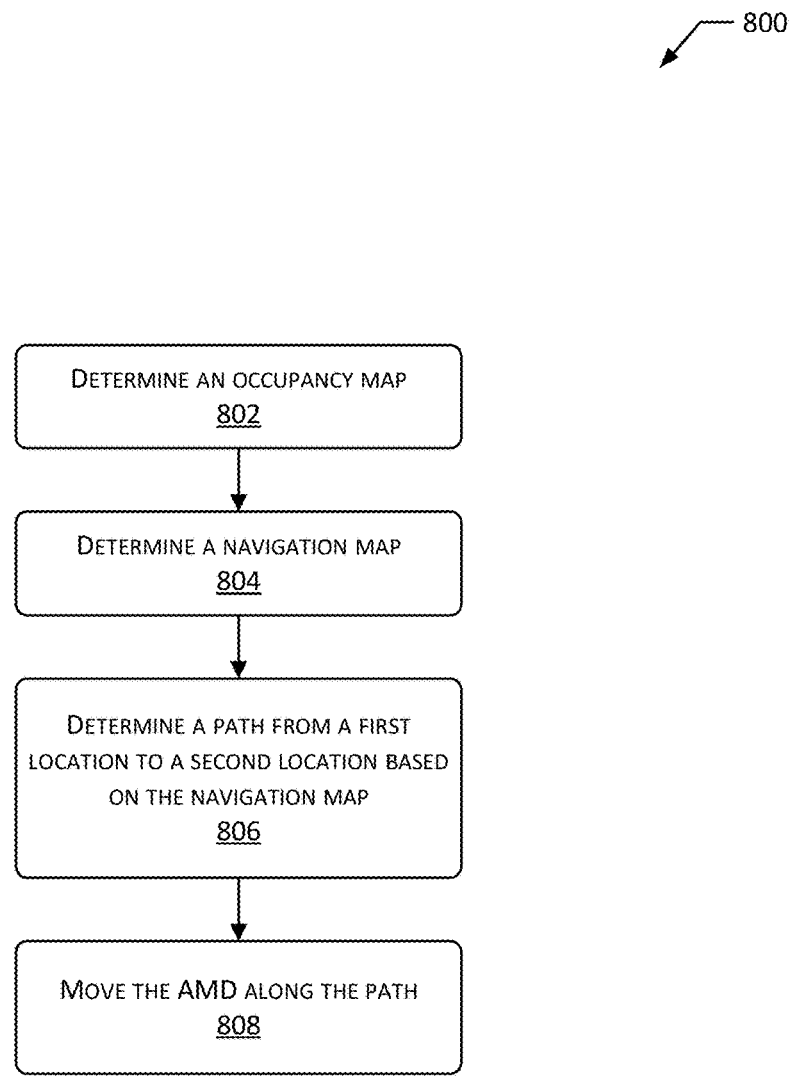
FIG. 8 illustrates a flow diagram of a process of using a navigation map to navigate an AMD, according to some implementations.

FIG. 8 illustrates a flow diagram 800 of a process of using a navigation map 138 to navigate an AMD 104, according to some implementations.

At 802 an occupancy map 132 is determined. For example, the mapping module 130 may use sensor data 126 to determine the presence and location of obstacles 110 in the physical space 102.

At 804 a navigation map 138 is determined. For example, the navigation map module 136 may accept as input the occupancy map 132 and may use one or more inflation parameters 230 to determine the navigation map 138.

At 806 a path 142 is determined from a first location to a second location, based on the navigation map 138. For example, the autonomous navigation module 140 may determine the path 142 so that no point on the path 142 passes through a cell 134 in the navigation map 138 that has an obstacle value 406 greater than the threshold value. In some situations, a plurality of paths 142 may be available. Other considerations may be used to select a particular path 142 from the plurality of paths 142. For example, a shortest path 142 may be selected, or a path 142 that maintains a maximum distance from users 112 may be selected.

At 808 the AMD 104 is moved along at least a portion of the path 142. For example, the autonomous navigation module 140 may generate instructions that are used to determine motor control instructions that operate the one or more motors 116 to move the AMD 104.

In some implementations data obtained by the AMD 104 during movement may be used to determine a second inflation distance d2 that may be used. For example, while moving along the path 142, the AMD 104 may detect a first number of obstacles that are less than a threshold distance from the AMD 104. A second inflation distance "d2" may be determined that is greater than the first inflation distance "d1". For example, d2 may equal the first inflation distance "d1" plus a value. A second navigation map 138 may then be determined using the second inflation distance "d2".

The determination of the navigation map 138 may be initiated if actual progress of the AMD 104 differs from a previously determined path 142 by more than a threshold value. For example, a first path 142(1) may be determined in the physical space 102 based on a first navigation map 138(1). The AMD 104 moves along at least a portion of the first path 142(1). An actual route of the AMD 104 is determined. The actual route is indicative of where the AMD 104 actually was at different points in time. A determination is made as to whether the actual route varies from the first path 142(1) by at least a threshold value. For example, if a distance may be determined between a point on the first path 142(1) where the AMD 104 was expected to be at a certain time and the actual path at that time. If the distance is greater than the threshold value, the navigation map module 136 may begin determining a second occupancy map 138(2).

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A robot comprising:
a camera;
one or more motors coupled to one or more wheels;
one or more memories storing first computer-executable instructions; and
one or more processors to execute the first computer-executable instructions to:
acquire image data from the camera;
determine, using the image data, an occupancy map of a physical space, the occupancy map comprising:
a two-dimensional array of cells comprising rows and columns corresponding to the physical space, and for each of the cells in the array, a value indicative of whether the cell is associated with an obstacle in the physical space;

determine a first distance based on one or more dimensions of the robot;

determine a first cell having a first value indicating that the first cell is associated with an obstacle in the physical space;

determine a first set of neighboring cells in the array that are less than or equal to the first distance from the first cell;

set a value for each of the first set of neighboring cells indicating that each cell is associated with an obstacle in the physical space;

determine a second cell in the array that is at a second distance from the first cell, wherein the second distance is twice the first distance plus one cell;

determine that the second cell is associated with an obstacle in the physical space;

determine a second set of neighboring cells in the array that are less than or equal to the first distance from the second cell; and set a value for each of the second set of neighboring cells indicating that each cell is associated with an obstacle in the physical space;

determine a first path from a first location to a second location based at least in part on the first set of neighboring cells and their values and the second set of neighboring cells and their values; and move the robot along the first path.

2. The robot of claim 1, wherein the one or more dimensions of the robot includes a width of the robot at a widest point.

3. The robot of claim 1, the one or more processors to execute the first computer-executable instructions to:
determine the first cell is associated with a first type of obstacle;
determine the second cell is associated with a second type of obstacle; and
wherein the first distance is based at least in part on the first type of obstacle and the second distance is based at least in part on the second type of obstacle.

4. A method performed at least in part by an autonomous mobile device (AMD), the method comprising:
determining an occupancy map of a physical space, the occupancy map comprising:
a plurality of cells in a specified arrangement, wherein each cell is associated with:
a first value that is representative of each cell within the specified arrangement,
a particular area within the physical space, and
a second value indicative of whether the particular area within the physical space contains an obstacle;
determining, based on a size of the AMD, a first distance; and
determining a first navigation map by iterating through the plurality of cells, at least one iteration comprising the following steps:
determining that the second value of a first cell in the plurality of cells is equal to or greater than a threshold value;
determining a first set of cells neighboring the first cell that is less than or equal to the first distance from the first cell; and
setting the second value for each of the cells in the first set of cells neighboring the first cell to be equal to or greater than the threshold value.

5. The method of claim 4, the steps further comprising:
determining an ordered set of candidate cells comprising cells that are equal to or less than a second distance from the first cell, wherein the second distance is twice the first distance plus one cell; and
determining a next cell from the ordered set of candidate cells, wherein the next cell comprises a first occurrence of a cell in the ordered set of candidate cells that has a second value equal to or greater than the threshold value.

6. The method of claim 4, wherein determining the first distance further comprises:
determining a first configuration of the AMD, wherein the first configuration is indicative of a footprint of the AMD.

7. The method of claim 4, further comprising:
determining an overall width of the AMD; and
wherein the first distance is greater than or equal to one half of the overall width.

8. The method of claim 4, further comprising:
determining the AMD is within a first region, wherein the first region comprises a designated area within the physical space; and
wherein the determining the first distance is further based on the first region.

9. The method of claim 4, wherein at least one of the plurality of cells in the occupancy map is associated with data indicative of an obstacle type; and
the determining the first distance is further based at least in part on the obstacle type.

10. The method of claim 4, further comprising:
determining a first path in the physical space based on the first navigation map;
moving the AMD along at least a portion of the first path;
detecting a first number of obstacles that are less than a threshold distance from the AMD while moving along the at least the portion of the first path;
determining a second distance that is greater than the first distance; and
determining a second navigation map using the second distance.

11. The method of claim 4, further comprising:
determining a first path in the physical space based on the first navigation map;
moving the AMD along at least a portion of the first path;
determining an actual route of the AMD;
determining the actual route varies from the first path by at least a second threshold value;
determining a second occupancy map;
determining a second navigation map based on the second occupancy map;
determining a second path in the physical space based on the second navigation map; and
moving the AMD along at least a portion of the second path.

12. A method comprising:
determining an occupancy map of a physical space, the occupancy map comprising:
a plurality of cells, wherein each cell is associated with:
a first value that is representative of each cell,
a particular area within the physical space, and
a second value indicative of whether the particular area within the physical space contains an obstacle;

determining, based on a size of an autonomous mobile device (AMD), a first distance; and determining a first navigation map by:
- determining that the second value associated with a first cell in the plurality of cells is equal to or greater than a threshold value;
- determining a first set of cells, wherein each cell of the first set of cells is less than or equal to the first distance from the first cell; and
- setting the second value for each of the cells in the first set of cells to be equal to or greater than the threshold value.

13. The method of claim 12, the determining the first navigation map further comprising:
- determining an ordered set of candidate cells comprising cells that are equal to or less than a second distance from the first cell, wherein the second distance is equal to or less than twice the first distance plus one cell; and
- determining a next cell from the ordered set of candidate cells, wherein the next cell comprises a first occurrence of a cell in the ordered set of candidate cells that has a second value equal to or greater than the threshold value.

14. The method of claim 12, wherein determining the first distance comprises:
- determining a first configuration of the AMD, wherein the first configuration is indicative of a footprint of the AMD.

15. The method of claim 12, further comprising:
determining an overall width of the AMD; and
wherein the first distance is greater than or equal to one half of the overall width.

16. The method of claim 12, further comprising:
determining the AMD is within a first region; and
wherein the determining the first distance is further based on the first region.

17. The method of claim 12, wherein at least one of the plurality of cells in the occupancy map is associated with data indicative of an obstacle type; and the determining the first distance is further based at least in part on the obstacle type.

18. The method of claim 12, wherein the first navigation map is determined using the first distance; and further comprising:
- determining a first path in the physical space based on the first navigation map;
- moving the AMD along at least a portion of the first path;
- detecting a first number of obstacles that are less than a threshold distance from the AMD while moving along the at least the portion of the first path;
- determining a second distance that is greater than the first distance; and
- determining a second navigation map using the second distance.

19. The method of claim 12, further comprising:
- determining a first path in the physical space based on the first navigation map;
- moving the AMD along at least a portion of the first path;
- determining an actual route of the AMD;
- determining the actual route varies from the first path by at least a second threshold value;
- determining a second occupancy map;
- determining a second navigation map based on the second occupancy map;
- determining a second path in the physical space based on the second navigation map; and
- moving the AMD along at least a portion of the second path.

20. The method of claim 12, further comprising:
- determining the first cell is associated with a first type of obstacle;
- determining a second cell is associated with a second type of obstacle; and
- wherein the first distance is based at least in part on the first type of obstacle and a second distance is based at least in part on the second type of obstacle.

* * * * *